United States Patent
Lapeyre et al.

[15] 3,704,484
[45] Dec. 5, 1972

[54] INSERT ROLLS FOR SHRIMP PEELING MACHINES

[72] Inventors: James M. Lapeyre; Robert F. Couret, both of New Orleans, La.

[73] Assignee: The Laitrom Corporation, New Orleans, La.

[22] Filed: Jan. 19, 1971

[21] Appl. No.: 107,745

[52] U.S. Cl. ..................................17/73
[51] Int. Cl. ..............................A22c 29/00
[58] Field of Search ........................17/71, 73

[56] References Cited

UNITED STATES PATENTS

| | | | |
|---|---|---|---|
| 2,778,055 | 1/1957 | Lapeyre et al. | 17/73 |
| 2,873,473 | 2/1959 | Martinez | 17/73 |
| 3,325,856 | 6/1967 | Pack et al. | 17/71 |

FOREIGN PATENTS OR APPLICATIONS

| | | | |
|---|---|---|---|
| 1,939,840 | 2/1970 | Germany | 17/71 |

*Primary Examiner*—Lucie H. Laudenslager
*Attorney*—Wilkinson, Mawhinney & Theibault

[57] ABSTRACT

The insert rolls of a Shrimp Peeling Machine are spirally or otherwise grooved to provide a series of spirally disposed knife-like edges upstanding from the surfaces of the rolls to improve the peeling action on shrimp as by offering rougher and sharper points and surfaces to better grasp the appendages of shrimp, such as the swimerettes and the edges of undersized shells whereby to pull and strip the shells from the meats.

2 Claims, 6 Drawing Figures

PATENTED DEC 5 1972

INVENTORS
JAMES M. LAPEYRE
ROBERT F. COURET

BY *Wilkinson, Mawhinney and Theibault*
ATTORNEYS

INVENTORS
JAMES M. LAPEYRE
ROBERT F. COURET

BY Wilkinson Mawhinney and Theibault
ATTORNEYS

INSERT ROLLS FOR SHRIMP PEELING MACHINES

The present invention relates to Insert Rolls for Shrimp Peeling Machines and has for an object certain improvements in the Insert Rolls of Shrimp Peeling Machines such as those disclosed in prior U.S. Pat. No. 2,778,055, granted Jan. 22, 1957, entitled MACHINE FOR PEELING SHRIMP.

Heretofore the surfaces of these insert rolls were sand blasted to roughen same for better grasp upon the ends of the shells and appendages of shrimp in the act of pulling the appendages and shells from the shrimp, thus freeing the meat.

It is an object of the invention to improve the insert rolls for better grasp upon the shrimp by producing, in the surfaces of the rolls, knife edges, sharp and rough, and outstanding from the surfaces thereof.

It is another object of the invention to improve the grasping action of the insert rolls still further by producing the knife edges in a spiral pattern running at least axially of the rollers whereby, incident to the rotation of the rollers the knife edges will have a sawing action.

With the foregoing and other objects in view, the invention will be more fully described hereinafter, and will be more particularly pointed out in the claims appended hereto.

In the drawings wherein like symbols refer to like or corresponding parts throughout the several views.

Figure 2:
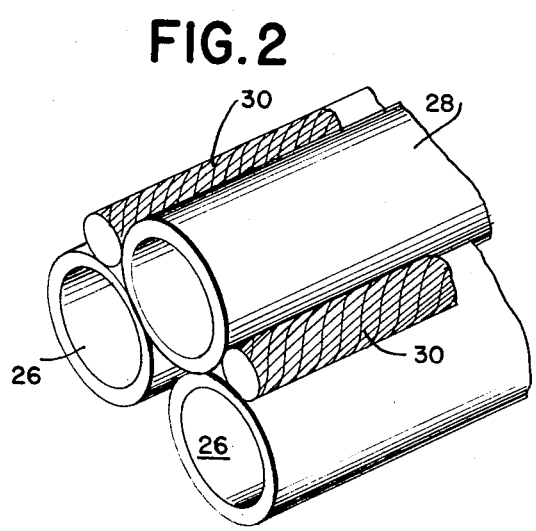
FIG. 2 is a fragmentary perspective view of a section of a shrimp peeling machine illustrating insert rollers grooved in one pattern according to the invention.

Referring more particularly to the drawings, reference is made to the illustration and description of the prior U.S. Pat. No. 2,778,055, aforesaid in which FIG. 13 of the Patent is similar in general outline to FIG. 2 of the instant application and FIG. 3 of the instant application is patterned generally after FIG. 2 of the patent.

The same numerals are used for common parts to stress points of novelty.

Figure 3:
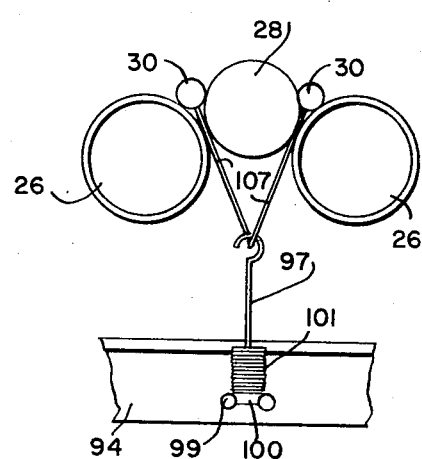
FIG. 3 is a vertical cross sectional view taken through a shrimp peeling machine incorporating the novel form of insert rollers.

Two power rollers 26 are spaced horizontally to form a crotch in which is supported the channel forming roller 28. The insert rollers 30 are mounted on opposite sides of the roller 28 and yieldably held to this position by the metallic straps 107 connected at their lower ends to a hooks 96 of hold-down shanks 97 as shown in FIG. 3. The lower end of the shank 97 is threaded to receive a nut 100 for adjusting the tension of coil spring 97 wound about shank 97 and having its lower convolution engaging the nut 100 and its upper convolution engages beneath the web of frame member 94.

The external cylindrical surfaces of the insert rolls 28 have heretofore been sandblasted to roughen same. Instead of sandblasting, according to the invention spiral or helical grooves 10 are cut or otherwise produced in the outer cylindrical surfaces of the insert rolls in such a manner as to produce throughout the entire cylindrical surface a whole series of spirally disposed knife-like edges 11 outstanding from the surfaces of the rolls to more positively grasp the edges of the shrimp shells, appendages, swimmerettes, etc.

Figure 4:
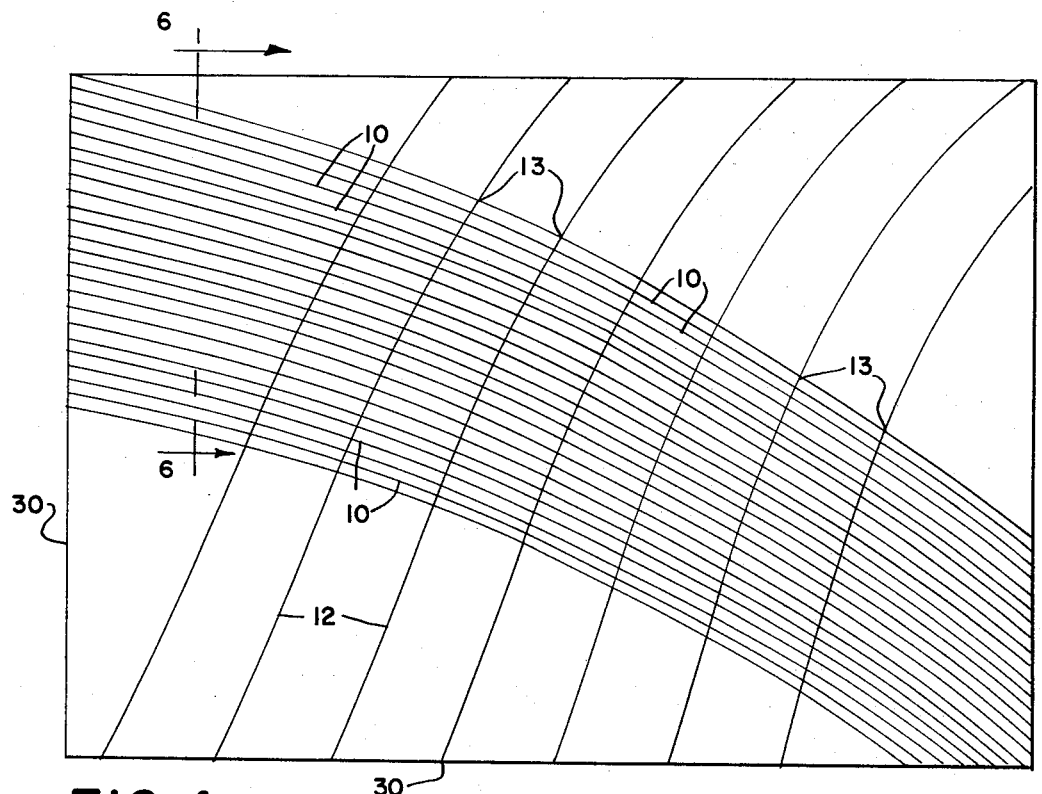
FIG. 4 is a plan view taken on a magnified scale showing a form of groove pattern in the insert rolls according to the invention.
Figure 5:
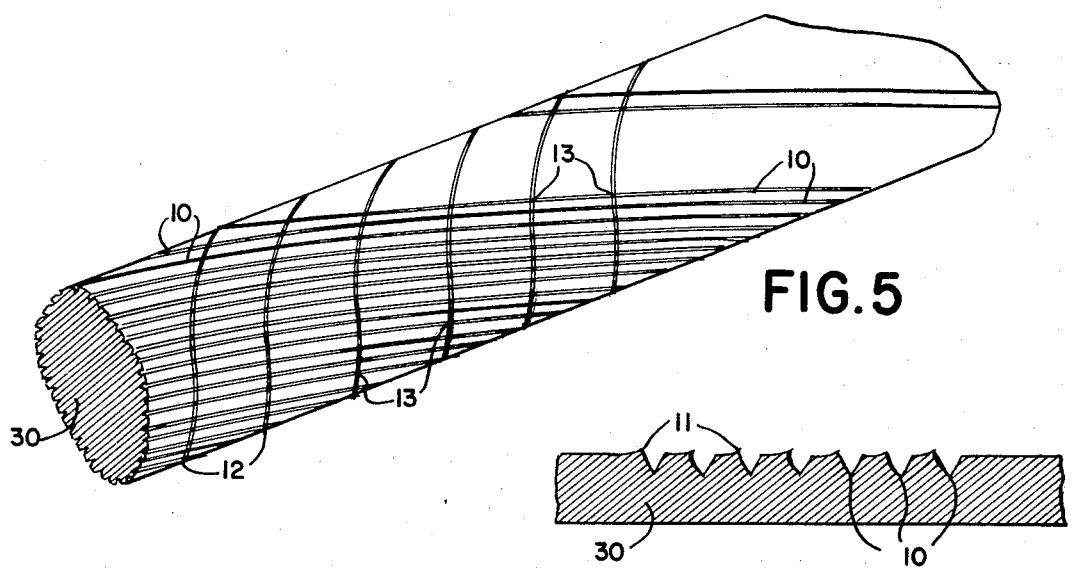
FIG. 5 is a fragmentary perspective view of one of the insert rollers showing double volute or spiral overlapping grooves.
Figure 6:
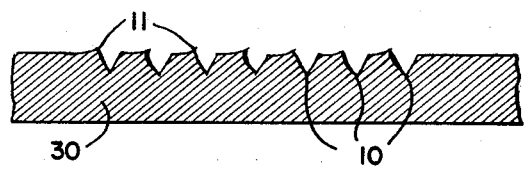
FIG. 6 is a sectional view taken through a portion of the insert roller on the line 6—6 of FIG. 4.

In FIGS. 4 and 5 the grooves 10 and their knife-like edges 11 follow a pattern in which the grooves progress in a right hand spiral viewed from the left end of the insert rollers 30. These grooves 10 are numerous and closely spaced but the same have a long lead. While a pattern of such grooves 10 is in itself found considerably more efficacious than the sandblasted variety, still greater efficiency may be had by the addition of other cooperating or contributing grooves 12 which are formed by left turn coils or helices and which have cross-over points 13 with the grooves 10, which cross-over points 13 contribute to additional disruptive surface areas of the insert rolls and accordingly make for superior grasping action of the rolls on the shrimp or the shells thereof.

The lead of the left hand grooves may if desired be the same as that of the primary grooves 10 but good results are found from a more open lead and one in which the convolutions are more closely spaced which adds to the number of cross-over points 13.

Figure 1:
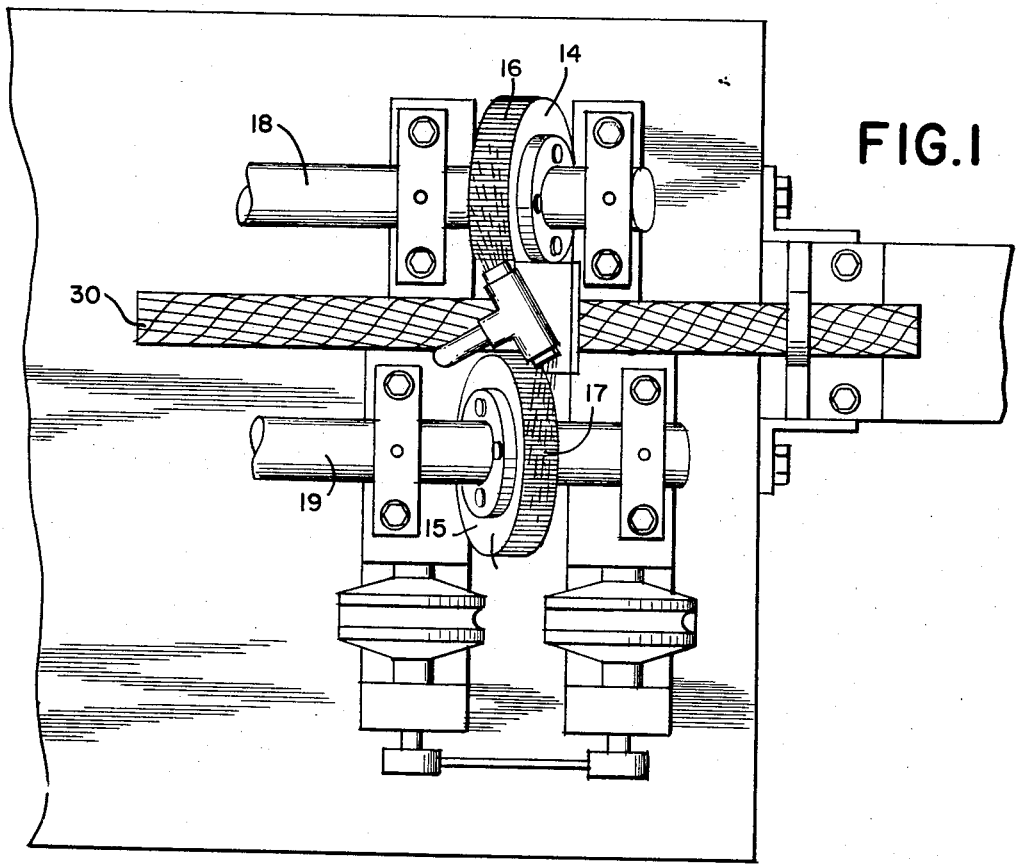
FIG. 1 is a top plan view of a machine for producing the spiral grooves in the insert rollers.

In FIG. 1 is illustrated a variety of machine for imparting to the surfaces of the insert rollers the grooved pattern above described. In this figure the cutter wheels 14 and 15 having groove cutting teeth 16 and 17 are mounted to rotate on reversely inclined shafts 18 and 19 and to operate on diametrically opposed sides of the insert roller 30 which is rotated as it is moved axially through the machine.

The knurling of the inserts as against sand blasting also has the great advantage of substantially longer life as through the constant attrition of continued use the sand blasted surfaces wear down to original smooth condition considerably sooner than the groove types of the invention.

What is claimed is:

1. In a machine for peeling shrimp or the like in which a bottom roller is associated with parallel side rollers disposed on opposite sides of the bottom roller and elevated therefrom to form a peeling channel, and insert rollers positioned between the bottom and side rollers, characterized in that the exposed outer surfaces of said insert rollers are rough in order to take better hold of the hulls of the shrimp to effect surer unwrapping of such hulls incident to rotation of the rollers, said rough surfaces on the insert rollers comprising longitudinally spiral channelled areas of at least two sets of spiral channels both extending longitudinally of the axes of the insert rollers one channel turning in one longitudinal direction about the axis of the roller and the other channel turning in the opposite direction about the axis of the roller, and said spiral channels having numerous points of intersection exposed on the surface of the insert rollers.

2. The combination as claimed in claim 1 in which the leads of the two spiral channels differ in length, increasing the convolutions in one channel over the other and adding to the number of cross-over points.

* * * * *